O. E. SZEKELY.
TRACTOR.
APPLICATION FILED DEC. 5, 1917.
1,292,142.
Patented Jan. 21, 1919.
3 SHEETS—SHEET 2.
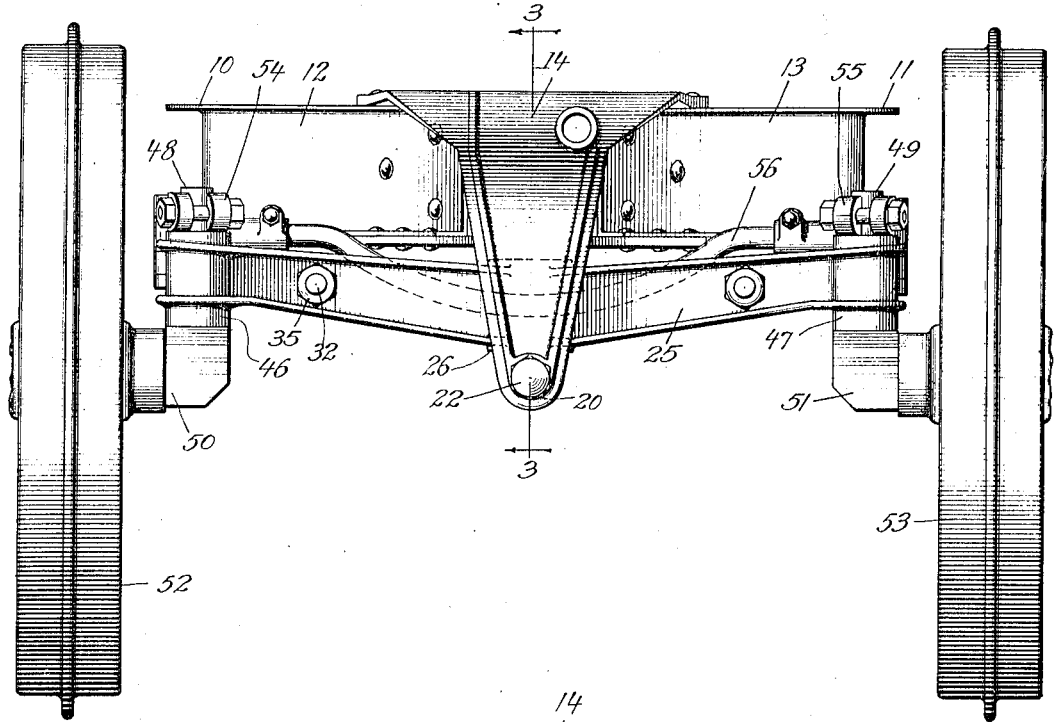
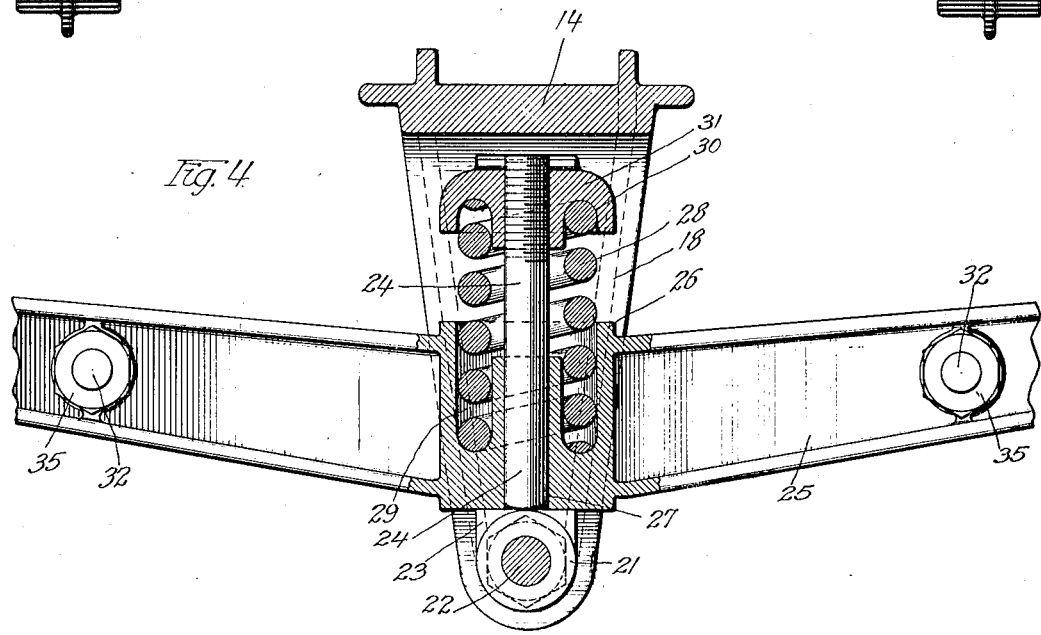

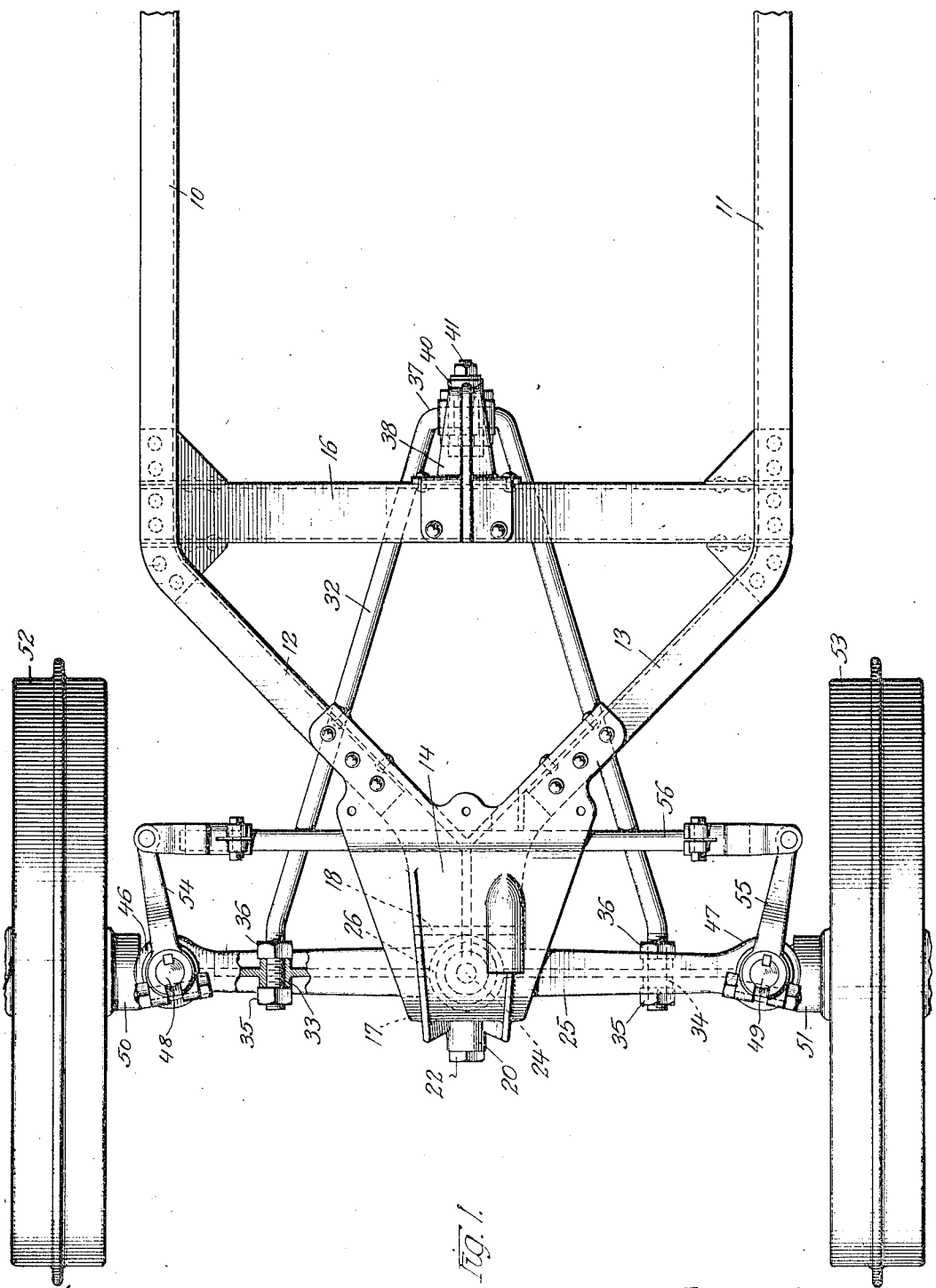

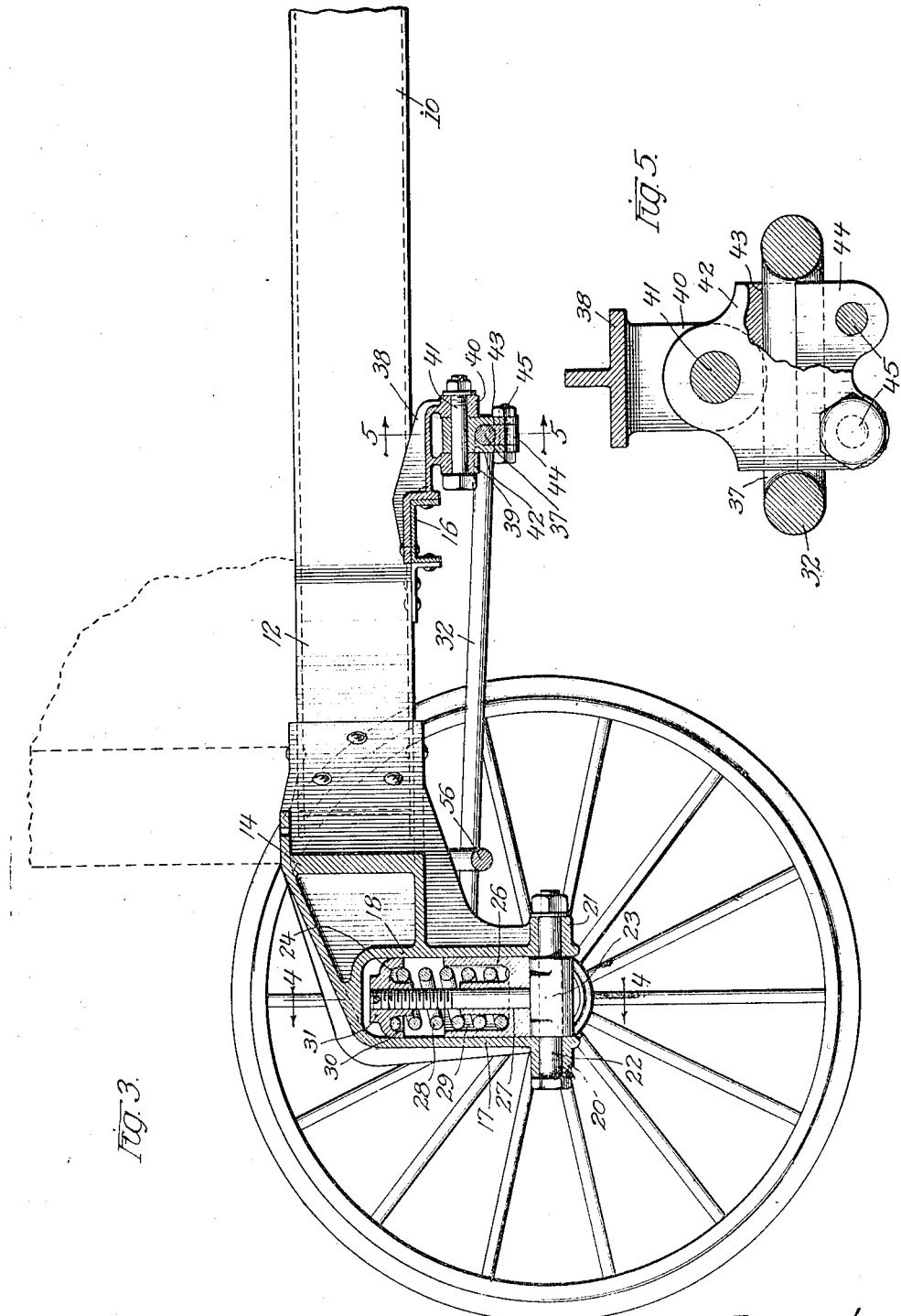

UNITED STATES PATENT OFFICE.

OTTO E. SZEKELY, OF ROCK ISLAND, ILLINOIS, ASSIGNOR TO VELIE MOTORS CORPORATION, OF MOLINE, ILLINOIS, A CORPORATION OF ILLINOIS.

TRACTOR.

1,292,142.             Specification of Letters Patent.     Patented Jan. 21, 1919.

Application filed December 5, 1917. Serial No. 205,497.

*To all whom it may concern:*

Be it known that I, OTTO E. SZEKELY, a citizen of the United States, and a resident of Rock Island, in the county of Rock Island and State of Illinois, have invented certain new and useful Improvements in Tractors, of which the following is a specification.

My invention relates to tractors and particularly to improved flexible steering axle structures therefor.

As tractors must travel over rough and uneven ground great flexibility combined with strength is required and the important object of my invention is to produce a simple, strong, and flexible steering axle structure for power driven tractors which will permit the vehicle to readily take and progress along rough and uneven ground without interfering with the operation of steering the front vehicle wheels connected with the axle structure by steering knuckles.

On the accompanying drawings the various features of the structure and arrangement of my invention are shown applied to a vehicle, and in these drawings—

Figure 1 is a plan view of the front end of a vehicle,

Fig. 2 is a front elevational view,

Fig. 3 is a sectional view on plane 3—3, Fig. 2,

Fig. 4 is an enlarged sectional view on plane 4—4, Fig. 3, and

Fig. 5 is an enlarged sectional view on plane 5—5, Fig. 3.

10 and 11 represent the channel bar side beams of the vehicle chassis and these beams have their front ends 12 and 13 deflected inwardly and rigidly secured to an axle supporting frame or casting 14, the beams at their bends being connected by a cross beam 16. The frame 14 deflects downwardly at its front end and provides the outer and inner vertical guide walls 17 and 18 which terminate at their lower ends in lugs 20 and 21 for supporting the pivot bolt 22 which extends horizontally in parallel with the chassis beams 10 and 11. Pivoted on the bolt 22 between the walls 17 and 18 is a block having the stud or pin 24 extending upwardly therefrom midway between the walls 17 and 18.

The vehicle front axle beam 25 has the central cylindrical hub 26, which hub has the central opening 27 receiving the stud 24 and the hub at its front and rear engaging with the walls 17 and 18 to be guided thereby. A compression spring 28 encircles the stud and seats in the annular pocket 29 of the hub and at its upper end seats in the annular pocket 30 of the abutment cap 31 threaded into the upper end of the stud, this spring tending to hold the axle beam down with its hub against the block 23. With the above described arrangement the axle beam is free to oscillate in a vertical plane with the block 23 which is pivoted on the bolt 22, and the axle beam can also move bodily vertically against the force of the spring 28, the spring 28 performing the functions of a front vehicle spring or springs.

The axle beam is held in position at right angles with the center line of the vehicle chassis by a radius V-shaped bail 32 whose limbs at their front ends are rigidly secured to the axle beam by extending through passageways 33 and 34 therein, the ends being threaded to receive front and rear lock nuts 35 and 36, this arrangement permitting longitudinal adjustment of the bail. The bail must be able to follow the oscillating movements and the bodily vertical movements of the axle beam, and the bail at its yoke 37 is therefore connected with the vehicle chassis by universal joint mechanism. This mechanism is clearly shown in Figs. 3 and 5. A bracket 38 is rigidly secured to the cross beam 16 and provides the downwardly extending opposed lugs 39 and 40 for supporting the pivot bolt 41 which is parallel with the chassis side beams. Pivoted at its upper end on this bolt between the lugs 39 and 40 is the bearing frame 42 having the pocket 43 for receiving the yoke 37 of the radius bail. To hold this yoke in the pocket a block 44 is provided which fits between the sides of the pocket and has the concave upper end for receiving the yoke 37 which is cylindrical. Bolts 45 passing through the bearing frame and block below the yoke detachably secure them together. With this arrangement the radius bail can oscillate around the bolt 41 when the axle beam oscillates, and can swing vertically during relative bodily movement of the axle beam and its supporting casting 14, the bail keeping the axle beam at right angles with the chassis center line during the various movements of the axle beam relative to the chassis.

The axle beam terminates at its outer ends in the vertical bearing hubs 46 and 47 for receiving the vertical pins 48 and 49 respectively, on the steering knuckles 50 and 51 whose horizontal ends pivot the vehicle front wheels 52 and 53. Clamped and secured to the upper ends of the knuckle pins are the arms 54 and 55 whose inner ends are connected by the steering rod 56 which in practice is connected with the steering train and wheel in any suitable manner. As best shown in Fig. 2, the steering rod 56 may be bent in order to clear the radius bail and the frame 14.

I thus produce a simple yet very strong steering axle structure for tractor vehicles which, owing to its flexibility is particularly adaptable to meet the rough traction conditions incident in the operation of tractors. On account of this flexibility the vehicle steering wheels will always take their share of the load and will always be in firm engagement with the ground in order that the vehicle can be efficiently guided. The axle structure being pivoted at its center to the vehicle chassis it can oscillate through a considerable range without transmission of severe bumps and jolts to the vehicle chassis, and the spring 28 performs the functions of a vehicle spring in reducing the force of the shocks and bumps. The radius bail, although adapted to keep the axle beam at right angles with the vehicle center line, is free to follow the relative movements of the axle beam and chassis without binding.

As changes and modifications are no doubt possible, I do not desire to be limited to the exact construction and arrangements shown and described.

I claim as follows:

1. In a traction vehicle, the combination with the vehicle chassis, of a frame secured to one end thereof, front and rear vertical guide walls on said frame, a pivot pin extending through the lower ends of said walls parallel with the vehicle center line, a block pivoted on said pin, a stud extending upwardly from said block between said walls, an axle extending between said walls and having a central vertical opening to slidably receive said stud whereby said axle may shift bodily vertically in said frame and oscillate with said block about said pivot pin, a spring tending to hold said axle against said block, and vehicle wheels at the ends of said axle.

2. In a traction vehicle, the combination with the vehicle chassis, of a frame secured to one end thereof, front and rear vertical guide walls on said frame, a pivot pin extending through said lower ends of said walls parallel with the vehicle center line, a block pivoted on said pin, a stud extending upwardly from said block between said walls, an axle extending between said walls and having a central vertical opening to slidably receive said stud whereby said axle may shift bodily vertically in said frame and oscillate with said block about said pivot pin, yielding means tending to hold said axle against said block, means for maintaining said axle at right angles to the vehicle center line during movement thereof relative to the chassis, and vehicle steering wheel structures pivoted to the ends of said axle.

3. In a traction vehicle, the combination with the vehicle chassis, of a frame secured to one end thereof, front and rear vertical guide walls on said frame, a pivot pin extending through said lower ends of said walls parallel with the vehicle center line, a block pivoted on said pin, a stud extending upwardly from said block between said walls, an axle extending between said walls and having a central vertical opening to slidably receive said stud whereby said axle may shift bodily vertically in said frame and oscillate with said block about said pivot pin, an abutment fitting at the upper end of said stud, a compression spring between said fitting and the axle tending to hold said axle against said block, means for maintaining said axle at right angles with the vehicle center line during movement thereof relative to the chassis, and vehicle steering wheel structures pivoted to the ends of said axle.

4. In a traction vehicle, the combination with the vehicle chassis, of a frame secured to the chassis at one end thereof and at the vehicle center line, an axle pivoted at its center to said frame to oscillate longitudinally, means permitting vertical bodily movement of said axle relative to said frame, a V-shaped radius bail secured at its ends to the axle at either side of the center thereof, and a flexible connection between the yoke of said radius bail and the vehicle chassis, said flexible connection being adapted to follow the movements of said axle relative to said frame and chassis but confining said bail to cause it to maintain said axle at all times at right angles with the vehicle center line.

In witness whereof, I hereunto subscribe my name this 30 day of November, A. D., 1917.

OTTO E. SZEKELY.